US012612529B2

(12) United States Patent
Yoshida et al.

(10) Patent No.: US 12,612,529 B2
(45) Date of Patent: Apr. 28, 2026

(54) ETHYLENE/ALPHA-OLEFIN COPOLYMER COMPOSITION AND APPLICATION THEREOF

(71) Applicant: MITSUI CHEMICALS, INC., Tokyo (JP)

(72) Inventors: Yuto Yoshida, Chiba (JP); Kuniaki Kawabe, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 1051 days.

(21) Appl. No.: 17/766,526

(22) PCT Filed: Oct. 6, 2020

(86) PCT No.: PCT/JP2020/037848

§ 371 (c)(1), (2) Date: Apr. 4, 2022

(87) PCT Pub. No.: WO2021/070811

PCT Pub. Date: Apr. 15, 2021

(65) Prior Publication Data

US 2022/0411659 A1 Dec. 29, 2022

(30) Foreign Application Priority Data

Oct. 7, 2019 (JP) ................................ 2019-184454

(51) Int. Cl.

| | |
|---|---|
| ***C09D 123/16*** | (2006.01) |
| ***C08F 210/16*** | (2006.01) |
| ***C08K 3/04*** | (2006.01) |
| ***C09D 7/20*** | (2018.01) |
| ***C09D 7/61*** | (2018.01) |
| ***C09D 11/033*** | (2014.01) |
| ***C09D 11/037*** | (2014.01) |
| ***C09D 11/108*** | (2014.01) |

(52) U.S. Cl.

CPC .......... *C09D 123/16* (2013.01); *C08F 210/16* (2013.01); *C08K 3/04* (2013.01); *C09D 7/20* (2018.01); *C09D 7/61* (2018.01); *C09D 11/033* (2013.01); *C09D 11/037* (2013.01); *C09D 11/108* (2013.01)

(58) Field of Classification Search

CPC .......... C09D 123/16; C09D 7/20; C09D 7/61; C09D 11/033; C09D 11/037; C09D 11/108; C08F 210/16; C08K 3/04

See application file for complete search history.

(56) References Cited

U.S. PATENT DOCUMENTS

| | | | |
|---|---|---|---|
| 6,939,928 | B1 | 9/2005 | Kawai et al. |
| 7,393,965 | B2 | 7/2008 | Tohi et al. |
| 7,449,533 | B2 | 11/2008 | Kawai et al. |
| 2005/0228155 | A1 | 10/2005 | Kawai et al. |
| 2006/0161013 | A1 | 7/2006 | Tohi et al. |

FOREIGN PATENT DOCUMENTS

| | | | |
|---|---|---|---|
| EP | 1 148 114 | A1 | 10/2001 |
| EP | 1 148 115 | A1 | 10/2001 |
| EP | 1 148 115 | B1 | 6/2005 |
| JP | S62-121710 | A | 6/1987 |
| JP | S63-218769 | A | 9/1988 |
| JP | 2000-290513 | A | 10/2000 |
| JP | 2004-175707 | A | 6/2004 |
| JP | 2006-194798 | A | 7/2006 |
| JP | 2007-099847 | A | 4/2007 |
| JP | 2014-070119 | A | 4/2014 |
| JP | 2015-168679 | A | 9/2015 |
| JP | 2016-041793 | A | 3/2016 |
| JP | 2018-123187 | A | 8/2018 |
| JP | 6545497 | B2 | 7/2019 |
| JP | 2019-143048 | A | 8/2019 |
| WO | WO-00/34420 | A1 | 6/2000 |
| WO | WO-01/27124 | A1 | 4/2001 |
| WO | WO-2004/029062 | A1 | 4/2004 |

OTHER PUBLICATIONS

English machine translation of JP 2016-041793. (Year: 2016).*
English machine translation of JP 2000-290513. (Year: 2000).*
"Measurement of polyethylene/polypropylene mixing ratio", Aichi Center for Industry and Science Technology, Mar. 2016, p. 6, with a translation of the Written Opinion.

* cited by examiner

*Primary Examiner* — Angela C Scott
(74) *Attorney, Agent, or Firm* — Foley & Lardner LLP

(57) ABSTRACT

An object of the present invention is to obtain a composition having, for example, improved anti-sagging properties, pigment dispersibility, and crack resistance, and the present invention relates to an ethylene/α-olefin copolymer composition including: an ethylene/α-olefin copolymer (A) satisfying requirements (a-1) to (a-3) described below; one or more selected from a color material (D), a resin (E) and an oil (F); and a solvent (C), (a-1) a methyl group index measured by $^1$H-NMR is in a range of 40 to 60%, (a-2) a weight average molecular weight (Mw) determined by gel permeation chromatography (GPC) is in a range of 3,000 to 30,000, (a-3) no melting peak is observed at temperatures ranging from −100° C. to 150° C. in differential scanning calorimetry (DSC).

11 Claims, No Drawings

ETHYLENE/ALPHA-OLEFIN COPOLYMER COMPOSITION AND APPLICATION THEREOF

CROSS-REFERENCE TO RELATED APPLICATIONS

The present application claims priority under 37 U.S.C. § 371 to International Patent Application No. PCT/JP2020/037848, filed Oct. 6, 2020, which claims priority to and the benefit of Japanese Patent Application No 2019-184454, filed on Oct. 7, 2019. The contents of these applications are hereby incorporated by reference in their entireties.

TECHNICAL FIELD

The present invention relates to ethylene/α-olefin copolymer compositions including ethylene/α-olefin copolymers, for suitable use in, for example, inks, paint materials, and coating materials, and applications thereof.

BACKGROUND ART

Liquid compositions such as inks, paint materials and coating materials are desired to have improved processability such as pigment dispersibility, anti-sagging properties and crack resistance for the purposes of improvements in, for example, storage stability, surface properties, and color development.

For example, Patent Literature 1 (JP-A-2014-70119) discloses a pigment dispersant including an esterified product of a polyoxyalkylene compound and a tetrabasic acid, for aqueous inks or paint materials. Patent Literature 2 (JP-A-2007-99847) proposes use of an acrylic acid/methacrylic acid ester copolymer as a viscosity modifier for prevention of sagging of inks in, for example, ballpoint pens. Patent Literature 3 (JP-A-2015-168679) reports that flexibility can be imparted to an epoxy resin by adding thereto a specified isocyanurate compound having a thioether bond and an ester bond in its structure.

While processability such as pigment dispersibility, anti-sagging properties and crack resistance can be partially improved by use of the additives disclosed in these Patent Literatures, such processability is demanded to be more improved.

CITATION LIST

Patent Literature

Patent Literature 1: JP-A-2014-70119
Patent Literature 2: JP-A-2007-99847
Patent Literature 3: JP-A-2015-168679

SUMMARY OF INVENTION

Technical Problem

An object of the present invention is to obtain a composition having improved processability such as anti-sagging properties, pigment dispersibility and crack resistance.

Solution to Problem

The present inventors made intensive studies in order to solve the above problems, and have consequently found that a composition having improved processability such as anti-sagging properties, pigment dispersibility and crack resistance can be obtained by using a specified ethylene/α-olefin copolymer (A), thereby leading to completion of the present invention.

In other words, the present invention relates to the following [1] to [12].

[1]

An ethylene/α-olefin copolymer composition comprising:

an ethylene/α-olefin copolymer (A) satisfying requirements (a-1) to (a-3) described below;

one or more selected from a color material (D), a resin (E) and an oil (F); and a solvent (C);

(a-1) a methyl group index measured by $^{1}$H-NMR is in a range of 40 to 60%, (a-2) a weight average molecular weight (Mw) determined by gel permeation chromatography (GPC) is in a range of 3,000 to 30,000, (a-3) no melting peak is observed at temperatures ranging from −100° C. to 150° C. in differential scanning calorimetry (DSC).

[2]

The ethylene/α-olefin copolymer composition described in Item [1], wherein the ethylene/α-olefin copolymer (A) is a modified copolymer modified by one or more selected from compounds having a carbon-carbon unsaturated bond.

[3]

The ethylene/α-olefin copolymer composition described in Item [1] or [2], wherein the ethylene/α-olefin copolymer (A) is a modified copolymer modified by one or more compounds selected from unsaturated carboxylic acids and unsaturated carboxylic acid derivatives.

[4]

The ethylene/α-olefin copolymer composition described in any one of Items [1] to [3], wherein the ethylene/α-olefin copolymer (A) is a modified copolymer modified by one or more compounds selected from unsaturated carboxylic acids and unsaturated carboxylic acid derivatives, and satisfies a requirement (b-1) described below, (b-1) an acid value is 0.1 to 200 mgKOH/g.

[5]

The ethylene/α-olefin copolymer composition described in any one of Items [1] to [4], wherein a content of the ethylene/α-olefin copolymer (A) is 0.1 to 50 mass % of the whole of the composition taken as 100 mass %.

[6]

The ethylene/α-olefin copolymer composition described in any one of Items [1] to [5], wherein the composition comprises the ethylene/α-olefin copolymer (A) as a processability improver.

[7]

The ethylene/α-olefin copolymer composition described in Item [1], wherein the solvent (C) comprises a solvent selected from aliphatic hydrocarbons and acetic acid esters.

[8]

The ethylene/α-olefin copolymer composition described in Item [1], wherein the composition comprises a pigment as the color material (D).

[9]

An ethylene/α-olefin copolymer composition produced by a process (α) described below, the composition comprising:

an ethylene/α-olefin copolymer (A) satisfying requirements (a-1) to (a-3) described below;

one or more selected from a color material (D), a resin (E) and an oil (F); and a solvent (C);

(a-1) a methyl group index measured by $^1$H-NMR is in a range of 40 to 60%, (a-2) a weight average molecular weight (Mw) determined by gel permeation chromatography (GPC) is in a range of 3,000 to 30,000, (a-3) no melting peak is observed at temperatures ranging from −100° C. to 150° C. in differential scanning calorimetry (DSC);

the process (α): a process comprising a step of polymerizing ethylene and an α-olefin by solution polymerization in the presence of a catalyst system comprising:

a bridged metallocene compound (a) represented by the formula 1, and at least one compound (b) selected from the group consisting of organoaluminum oxy compounds (b1) and compounds (b2) capable of reacting with the bridged metallocene compound (a) to form an ion pair.

[Chem. 1]

(Formula 1)

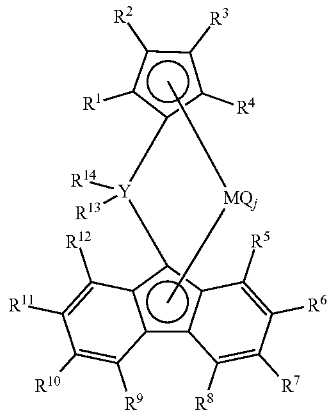

[in the formula 1, $R^1$, $R^2$, $R^3$, $R^4$, $R^5$, $R^8$, $R^9$ and $R^{12}$ are each independently a hydrogen atom, a hydrocarbon group or a silicon-containing hydrocarbon group and a plurality of these groups that are adjacent to one another may be linked together to form a ring structure, $R^6$ and $R^{11}$ are the same as each other and are hydrogen atoms, hydrocarbon groups or silicon-containing hydrocarbon groups, $R^7$ and $R^{10}$ are the same as each other and are hydrogen atoms, hydrocarbon groups or silicon-containing hydrocarbon groups, $R^6$ and $R^7$ may bond to a C2-C3 hydrocarbon to form a ring structure, $R^{10}$ and $R^{11}$ may bond to a C2-C3 hydrocarbon to form a ring structure, $R^6$, $R^7$, $R^{10}$ and $R^{11}$ are not hydrogen atoms at the same time;

Y is a carbon atom or a silicon atom;

$R^{13}$ and $R^{14}$ are each independently an aryl group;

M is Ti, Zr or Hf;

Q independently at each occurrence is a halogen atom, a hydrocarbon group, an anionic ligand or a neutral ligand capable of coordinating to a lone electron pair; and j is an integer of 1 to 4].

[10]

An ink comprising the ethylene/α-olefin copolymer composition described in any one of Items [1] to [9].

[11]

A paint material comprising the ethylene/α-olefin copolymer composition described in any one of Items [1] to [9].

[12]

A coating material comprising the ethylene/α-olefin copolymer composition described in any one of Items [1] to [9].

Advantageous Effects of Invention

The ethylene/α-olefin copolymer composition of the present invention can be suitably used for, for example, inks, paint materials, and coating materials because the composition has excellent dispersibility of a material added such as a color material, improved anti-sagging properties in processing and use, and has crack resistance when dried.

DESCRIPTION OF EMBODIMENTS

Hereinbelow, the present invention will be described in detail. In the present specification, numerical ranges indicated with "to", for example, "M to N" mean "not less than M and not more than N" unless particularly noted.

In the present specification, phrases such as "constituent unit derived from M" in which M represents an olefin that constitutes a polymer mean a "constituent unit corresponding to M", namely, a constituent unit with a pair of bonding hands which results from the cleavage of a n bond constituting a double bond in M.

In the present specification, the term "(meth)acrylic" is used as a general term including the concepts of acrylic, methacrylic, and both acrylic and methacrylic.

Ethylene/α-Olefin Copolymer (A)

The ethylene/α-olefin copolymer (A) constituting the ethylene/α-olefin copolymer composition of the present invention is characterized by including an ethylene/α-olefin copolymer (A) satisfying requirements (a-1) to (a-3) described below [hereinafter, sometimes abbreviated as "copolymer (A)".].

(a-1) The methyl group index measured by $^1$H-NMR is in the range of 40 to 60%, preferably in the range of 43 to 57%.

The above range of the methyl group index ensures that proper surface tension is obtained and thus the dispersibility of a material added such as a color material included in the composition is excellent, and furthermore low crystallinity or non-crystallinity is obtained and thus a composition can be provided which is excellent in compatibility with other components included in the composition and which can be easily mixed with such other components.

Methyl group protons of the ethylene/α-olefin copolymer give rise to a peak on a high magnetic field side in $^1$H-NMR measurement ("Kobunshi Bunseki Handbook (Polymer Analysis Handbook)" (published from Asakura Publishing Co., Ltd., pp. 163-170)).

The methyl group index of the ethylene/α-olefin copolymer (A) according to the present invention is a methyl group index based on the proportion of a peak observed on a high magnetic field side in $^1$H-NMR measurement (the "methyl group index"). Specifically, the methyl group index is the ratio of the integral of a peak observed in the range of 0.50 to 1.15 ppm to the integral of a peak observed in the range of 0.50 to 2.20 ppm in a 1H-NMR spectrum of a solution of the copolymer (A) in deuterated chloroform, the positions of the peaks being calculated relative to a solvent peak appearing at 7.24 ppm, assigned to $CHCl_3$ in deuterated chloroform as a reference. Specifically, the $^1$H-NMR measurement method may be a method described in Examples later.

Here, almost all the peaks based on the copolymer (A) are found in the range of 0.50 to 2.20 ppm. In this range, the peak assigned to methyl groups is frequently found in the range of 0.50 to 1.15 ppm.

(a-2) The weight average molecular weight (Mw) determined by gel permeation chromatography (GPC) is in the range of 3,000 to 30,000, preferably in the range of 3,500 to 27,000, more preferably in the range of 4,000 to 25,000.

The above range of the Mw of the copolymer (A) ensures that a proper thickening effect is exerted by addition of the composition and fluidity and anti-sagging properties are improved.

The Mw of the copolymer (A) may be measured by gel permeation chromatography (GPC) calibrated with standards (monodispersed polystyrene) having known molecular weights, and may be measured specifically by a method described in Examples later.

(a-3) No melting peak is observed at temperatures ranging from −100° C. to 150° C. in differential scanning calorimetry (DSC).

In the present invention, the phrase that no melting peak is observed means that a heat of fusion (ΔH, unit: J/g) measured by DSC is not substantially measured at the above temperature range. The phrase that ΔH is not substantially measured means that no peaks are observed in DSC measurement or the heat of fusion that is measured is not more than 1 J/g.

The copolymer (A) in the present invention, in which no melting peak is observed, is thus preferable because of being excellent in compatibility with other components included in the composition and of being capable of imparting crack resistance to a coating film formed by coating with a composition to which the copolymer (A) is added.

The melting point in the present invention may be measured by a method described in Examples later.

The copolymer (A) in the present invention is preferably in the liquid state at ordinary temperature (for example: 20 to 25° C.). The liquid state at ordinary temperature is preferable because of leading to excellent compatibility with other components included in a liquid composition, and of enabling crack resistance to be imparted to a coating film formed by coating with a liquid composition to which the copolymer (A) of the present invention is added.

The α-olefin constituting the ethylene/α-olefin copolymer (A) in the present invention is a C3-C20 α-olefin. Examples of the C3-C20 α-olefins include linear α-olefins such as propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene and 1-eicosene, and branched α-olefins such as 3-methyl-1-pentene, 4-methyl-1-pentene, 8-methyl-1-nonene, 7-methyl-1-decene, 6-methyl-1-undecene and 6,8-dimethyl-1-decene. These α-olefins may be used singly, or two or more may be used.

Among those α-olefins mentioned above, C3-C10 α-olefins, particularly propylene, are preferable.

The ethylene content (constituent unit derived from ethylene) of the copolymer (A) in the present invention is not particularly limited as long as the methyl group index measured by $^1$H-NMR satisfies the range of 40 to 60%, and the content is usually in the range of 30 to 75 mol %, more preferably in the range of 40 to 65 mol %.

In the copolymer (A) in the present invention, the content of constituent units derived from a C6-C20 α-olefin is preferably less than 50 mol %.

The copolymer (A) in the present invention may be a copolymer including a modified copolymer described below, or may be the modified copolymer.

Methods for Producing Ethylene/α-Olefin Copolymer (A)

The copolymer (A) in the present invention may be produced by a known method without limitation. In an exemplary method, ethylene and an α-olefin may be copolymerized in the presence of a catalyst that includes a compound including a transition metal such as vanadium, zirconium, titanium or hafnium, and an organoaluminum compound (encompassing an organoaluminum oxy compound) and/or an ionized ionic compound. Examples of such methods include those described in, for example, WO 2000/34420, JP-A-S62-121710, WO 2004/29062, JP-A-2004-175707, and WO 2001/27124. Among those methods mentioned above, for example, a method using a catalyst system including a metallocene compound such as zirconocene and an organoaluminum oxy compound (aluminoxane) is more preferable because not only the copolymer can be produced at high polymerization activity, but also the copolymer obtained can be reduced in chlorine content and 2,1-insertion of an α-olefin.

The copolymer (A) is produced by the following process (α).

The process (α): A process including a step of polymerizing ethylene and an α-olefin by solution polymerization in the presence of a catalyst system that includes:

- a bridged metallocene compound (a) represented by the formula 1, and
- at least one compound (b) selected from the group consisting of organoaluminum oxy compounds (b1) and compounds (b2) capable of reacting with the bridged metallocene compound (a) to form an ion pair.

[Chem. 2]

(Formula 1)

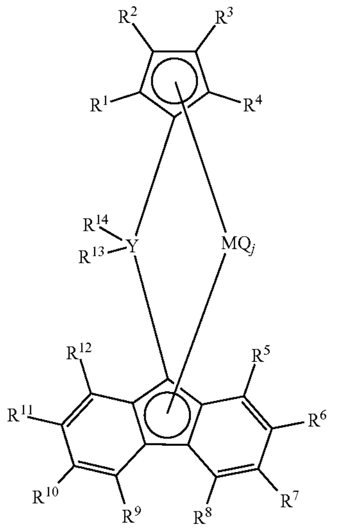

[In the formula 1, $R^1$, $R^2$, $R^3$, $R^4$, $R^5$, $R^8$, $R^9$ and $R^{12}$ are each independently a hydrogen atom, a hydrocarbon group or a silicon-containing hydrocarbon group and a plurality of these groups that are adjacent to one another may be linked together to form a ring structure, $R^6$ and $R^{11}$ are the same as each other and are hydrogen atoms, hydrocarbon groups or silicon-containing hydrocarbon groups, $R^7$ and $R^{10}$ are the same as each other and are hydrogen atoms, hydrocarbon groups or silicon-containing hydrocarbon groups, $R^6$ and $R^7$ may bond to a C2-C3 hydrocarbon to form a ring structure, $R^{10}$ and $R^{11}$ may bond to a C2-C3 hydrocarbon to form a ring structure, $R^6$, $R^7$, $R^{10}$ and $R^{11}$ are not hydrogen atoms at the same time;

Y is a carbon atom or a silicon atom;

$R^{13}$ and $R^{14}$ are each independently an aryl group;

M is Ti, Zr or Hf;

Q independently at each occurrence is a halogen atom, a hydrocarbon group, an anionic ligand or a neutral ligand capable of coordinating to a lone electron pair; and j is an integer of 1 to 4.]

The number of carbon atoms in the hydrocarbon groups is preferably 1 to 20, more preferably 1 to 15, and still more preferably 4 to 10. Examples of the hydrocarbon groups include alkyl groups and aryl groups. The number of carbon atoms in the aryl groups is preferably 6 to 20, and more preferably 6 to 15.

Examples of the silicon-containing hydrocarbon groups include C3-C20 alkyl and aryl groups each containing 1 to 4 silicon atoms. Specific examples include trimethylsilyl group, tert-butyldimethylsilyl group and triphenylsilyl group.

In the formula 1, the cyclopentadienyl group may be substituted or unsubstituted.

In the formula 1, (i) at least one of the substituents ($R^1$, $R^2$, $R^3$ and $R^4$) bonded to the cyclopentadienyl group is preferably a hydrocarbon group;

(ii) at least one of the substituents ($R^1$, $R^2$, $R^3$ and $R^4$) is more preferably a C4 or higher hydrocarbon group; and (iii) the substituent ($R^2$ or $R^3$) bonded to the 3-position of the cyclopentadienyl group is most preferably a C4 or higher hydrocarbon group (for example, an n-butyl group).

When at least two of $R^1$, $R^2$, $R^3$ and $R^4$ are substituents (that is, are not hydrogen atoms), the substituents may be the same as or different from one another, and at least one substituent is preferably a C4 or higher hydrocarbon group.

When the copolymer (A) is synthesized by high-temperature solution polymerization, it is preferable for taking advantage of high polymerization activity that $R^6$ and $R^{11}$ be not hydrogen atoms, and it is more preferable for the same purpose that $R^6$, $R^7$, $R^{10}$ and $R^{11}$ be not hydrogen atoms. $R^6$ and $R^{11}$ are, for example, the same C1-C20 hydrocarbon groups, and preferably tert-butyl groups. $R^7$ and $R^{10}$ are, for example, the same C1-C20 hydrocarbon groups, and preferably tert-butyl groups.

The main chain moiety (the bonding moiety Y) that connects the cyclopentadienyl group to the fluorenyl group is a covalently bonded bridge that imparts steric rigidity to the bridged metallocene compound (a). The moiety Y has two aryl groups ($R^{13}$ and $R^{14}$) which may be the same as or different from each other. That is, the cyclopentadienyl group and the fluorenyl group are linked via a covalently bonded bridge including aryl groups. From the point of view of easy production, it is preferable that $R^{13}$ and $R^{14}$ be the same groups.

Examples of the aryl groups represented by $R^{13}$ and $R^{14}$ include phenyl group, naphthyl group, anthracenyl group, and substituted aryl groups (phenyl group, naphthyl group and anthracenyl group substituted with one or more substituents in place of aromatic hydrogens ($sp^2$ hydrogens)). Examples of the substituents in the substituted aryl groups include C1-C20 hydrocarbon groups, C1-C20 silicon-containing hydrocarbon groups, and halogen atoms, with phenyl group being preferable.

Q is preferably a halogen atom or a C1-C10 hydrocarbon group. Examples of the halogen atoms include fluorine, chlorine, bromine and iodine atoms. Examples of the C1-C10 hydrocarbon groups include methyl group, ethyl group, n-propyl group, isopropyl group, 2-methylpropyl group, 1,1-dimethylpropyl group, 2,2-dimethylpropyl group, 1,1-diethylpropyl group, 1-ethyl-1-methylpropyl group, 1,1,2,2-tetramethylpropyl group, sec-butyl group, tert-butyl group, 1,1-dimethylbutyl group, 1,1,3-trimethylbutyl group, neopentyl group, cyclohexylmethyl group, cyclohexyl group and 1-methyl-1-cyclohexyl group.

When j is an integer of 2 or greater, the plurality of Q may be the same as or different from one another.

Examples of such bridged metallocene compounds (a) include:

ethylene[$\eta^5$-(3-tert-butyl-5-methylcyclopentadienyl)]($\eta^5$-fluorenyl)zirconium dichloride, ethylene[$\eta^5$-(3-tert-butyl-5-methylcyclopentadienyl)][$\eta^5$-(3, 6-di-tert-butylfluorenyl)]zirconium dichloride, ethylene[$\eta^5$-(3-tert-butyl-5-methylcyclopentadienyl)][$\eta^5$-(2, 7-di-tert-butylfluorenyl)]zirconium dichloride, ethylene[$\eta^5$-(3-tert-butyl-5-methylcyclopentadienyl)](octamethyloctahydrodibenzofluorenyl)zirconium dichloride, ethylene[$\eta^5$-(3-tert-butyl-5-methylcyclopentadienyl)](benzofluorenyl)zirconium dichloride, ethylene[$\eta^5$-(3-tert-butyl-5-methylcyclopentadienyl)](dibenzofluorenyl)zirconium dichloride, ethylene[$\eta^5$-(3-tert-butyl-5-methylcyclopentadienyl)](octahydrodibenzofluorenyl)zirconium dichloride, ethylene[$\eta^5$-(3-tert-butyl-5-methylcyclopentadienyl)][$\eta$-(2, 7-diphenyl-3,6-di-tert-butylfluorenyl)]zirconium dichloride, ethylene[$\eta^5$-(3-tert-butyl-5-methylcyclopentadienyl)][$\eta$-(2, 7-dimethyl-3,6-di-tert-butylfluorenyl)]zirconium dichloride, ethylene[$\eta^5$-(3-tert-butylcyclopentadienyl)]($\eta^5$-fluorenyl) zirconium dichloride, ethylene[$\eta^5$-(3-tert-butylcyclopentadienyl)][$\eta^5$-(3,6-di-tert-butylfluorenyl)]zirconium dichloride, ethylene[$\eta^5$-(3-tert-butylcyclopentadienyl)][$\eta^5$-(2,7-di-tert-butylfluorenyl)]zirconium dichloride, ethylene[$\eta^5$-(3-tert-butylcyclopentadienyl)](octamethyloctahydrodibenzofluorenyl)zirconium dichloride, ethylene[$\eta^5$-(3-tert-butylcyclopentadienyl)](benzofluorenyl) zirconium dichloride, ethylene[$\eta^5$-(3-tert-butylcyclopentadienyl)](dibenzofluorenyl)zirconium dichloride, ethylene[$\eta^5$-(3-tert-butylcyclopentadienyl)](octahydrodibenzofluorenyl)zirconium dichloride, ethylene[$\eta^5$-(3-tert-butylcyclopentadienyl)][$\eta^5$-(2,7-diphenyl-3,6-di-tert-butylfluorenyl)]zirconium dichloride, ethylene[$\eta^5$-(3-tert-butylcyclopentadienyl)][$\eta^5$-(2,7-dimethyl-3,6-di-tert-butylfluorenyl)]zirconium dichloride, ethylene[$\eta^5$-(3-n-butylcyclopentadienyl)]($\eta^5$-fluorenyl)zirconium dichloride,
ethylene[$\eta^5$-(3-n-butylcyclopentadienyl)][$\eta$-(3,6-di-tert-butylfluorenyl)]zirconium dichloride,
ethylene[$\eta^5$-(3-n-butylcyclopentadienyl)][$\eta$-(2,7-di-tert-butylfluorenyl)]zirconium dichloride,
ethylene[$\eta^5$-(3-n-butylcyclopentadienyl)](octamethyloctahydrodibenzofluorenyl)zirconium dichloride,
ethylene[$\eta^5$-(3-n-butylcyclopentadienyl)](benzofluorenyl) zirconium dichloride,
ethylene[$\eta^5$-(3-n-butylcyclopentadienyl)](dibenzofluorenyl)zirconium dichloride,
ethylene[$\eta^5$-(3-n-butylcyclopentadienyl)](octahydrodibenzofluorenyl)zirconium dichloride,
ethylene[$\eta^5$-(3-n-butylcyclopentadienyl)][$\eta^5$-(2,7-diphenyl-3,6-di-tert-butylfluorenyl)]zirconium dichloride,
ethylene[$\eta^5$-(3-n-butylcyclopentadienyl)][$\eta^5$-(2,7-dimethyl-3,6-di-tert-butylfluorenyl)]zirconium dichloride,
diphenylmethylene[$\eta^5$-(3-tert-butyl-5-methylcyclopentadienyl)]($\eta^5$-fluorenyl)zirconium dichloride,
diphenylmethylene[$\eta^5$-(3-tert-butyl-5-methylcyclopentadienyl)][$\eta^5$-(3,6-di-tert-butylfluorenyl)]zirconium dichloride,
diphenylmethylene[$\eta^5$-(3-tert-butyl-5-methylcyclopentadienyl)][$\eta^5$-(2,7-di-tert-butylfluorenyl)]zirconium dichloride,
diphenylmethylene[$\eta^5$-(3-tert-butyl-5-methylcyclopentadienyl)](octamethyloctahydrodibenzofluorenyl)zirconium dichloride,
diphenylmethylene[$\eta^5$-(3-tert-butyl-5-methylcyclopentadienyl)](benzofluorenyl)zirconium dichloride,
diphenylmethylene[$\eta^5$-(3-tert-butyl-5-methylcyclopentadienyl)](dibenzofluorenyl)zirconium dichloride,
diphenylmethylene[$\eta^5$-(3-tert-butyl-5-methylcyclopentadienyl)](octahydrodibenzofluorenyl)zirconium dichloride,
diphenylmethylene[$\eta^5$-(3-tert-butyl-5-methylcyclopentadienyl)][$\eta^5$-(2,7-diphenyl-3,6-di-tert-butylfluorenyl)]zirconium dichloride,
diphenylmethylene[$\eta^5$-(3-tert-butyl-5-methylcyclopentadienyl)][$\eta^5$-(2,7-dimethyl-3,6-di-tert-butylfluorenyl)]zirconium dichloride,
diphenylmethylene[$\eta^5$-(3-tert-butylcyclopentadienyl)]($\eta^5$-fluorenyl)zirconium dichloride,
diphenylmethylene[$\eta^5$-(3-tert-butylcyclopentadienyl)][$\eta^5$-(3, 6-di-tert-butylfluorenyl)]zirconium dichloride,
diphenylmethylene[$\eta^5$-(3-tert-butylcyclopentadienyl)][$\eta^5$-(2, 7-di-tert-butylfluorenyl)]zirconium dichloride,
diphenylmethylene[$\eta^5$-(3-tert-butylcyclopentadienyl)](octamethyloctahydrodibenzofluorenyl)zirconium dichloride,
diphenylmethylene[$\eta^5$-(3-tert-butylcyclopentadienyl)](benzofluorenyl)zirconium dichloride,
diphenylmethylene[$\eta^5$-(3-tert-butylcyclopentadienyl)] (dibenzofluorenyl)zirconium dichloride,
diphenylmethylene[$\eta^5$-(3-tert-butylcyclopentadienyl)](octahydrodibenzofluorenyl)zirconium dichloride,
diphenylmethylene[$\eta^5$-(3-tert-butylcyclopentadienyl)][$\eta$-(2, 7-diphenyl-3,6-di-tert-butylfluorenyl)]zirconium dichloride,
diphenylmethylene[$\eta^5$-(3-tert-butylcyclopentadienyl)][$\eta^5$-(2, 7-dimethyl-3,6-di-tert-butylfluorenyl)]zirconium dichloride,
diphenylmethylene[$\eta^5$-(3-n-butylcyclopentadienyl)]($\eta^5$-fluorenyl)zirconium dichloride,
diphenylmethylene[$\eta^5$-(3-n-butylcyclopentadienyl)][$\eta^5$-(3, 6-di-tert-butylfluorenyl)]zirconium dichloride,
diphenylmethylene[$\eta^5$-(3-n-butylcyclopentadienyl)][$\eta^5$-(2, 7-di-tert-butylfluorenyl)]zirconium dichloride,
diphenylmethylene[$\eta^5$-(3-n-butylcyclopentadienyl)](octamethyloctahydrodibenzofluorenyl)zirconium dichloride,
diphenylmethylene[$\eta^5$-(3-n-butylcyclopentadienyl)](benzofluorenyl)zirconium dichloride,
diphenylmethylene[$\eta^5$-(3-n-butylcyclopentadienyl)](dibenzofluorenyl)zirconium dichloride,
diphenylmethylene[$\eta^5$-(3-n-butylcyclopentadienyl)](octahydrodibenzofluorenyl)zirconium dichloride,
diphenylmethylene[$\eta^5$-(3-n-butylcyclopentadienyl)][$\eta$-(2, 7-diphenyl-3,6-di-tert-butylfluorenyl)]zirconium dichloride,
diphenylmethylene[$\eta^5$-(3-n-butylcyclopentadienyl)][$\eta$-(2, 7-dimethyl-3,6-di-tert-butylfluorenyl)]zirconium dichloride,
di(p-tolyl)methylene[$\eta^5$-(3-tert-butyl-5-methylcyclopentadienyl)]($\eta^5$-fluorenyl)zirconium dichloride,
di(p-tolyl)methylene[$\eta^5$-(3-tert-butyl-5-methylcyclopentadienyl)][$\eta^5$-(3,6-di-tert-butylfluorenyl)]zirconium dichloride,
di(p-tolyl)methylene[$\eta^5$-(3-tert-butyl-5-methylcyclopentadienyl)][$\eta^5$-(2,7-di-tert-butylfluorenyl)]zirconium dichloride,
di(p-tolyl)methylene[$\eta^5$-(3-tert-butyl-5-methylcyclopentadienyl)](octamethyloctahydrodibenzofluorenyl)zirconium dichloride,
di(p-tolyl)methylene[$\eta^5$-(3-tert-butyl-5-methylcyclopentadienyl)](benzofluorenyl)zirconium dichloride,
di(p-tolyl)methylene[$\eta^5$-(3-tert-butyl-5-methylcyclopentadienyl)](dibenzofluorenyl)zirconium dichloride,
di(p-tolyl)methylene[$\eta^5$-(3-tert-butyl-5-methylcyclopentadienyl)](octahydrodibenzofluorenyl)zirconium dichloride,
di(p-tolyl)methylene[$\eta^5$-(3-tert-butyl-5-methylcyclopentadienyl)][$\eta^5$-(2,7-diphenyl-3,6-di-tert-butylfluorenyl)]zirconium dichloride,
di(p-tolyl)methylene[$\eta^5$-(3-tert-butyl-5-methylcyclopentadienyl)][$\eta^5$-(2,7-dimethyl-3,6-di-tert-butylfluorenyl)]zirconium dichloride,
di(p-tolyl)methylene[$\eta^5$-(3-tert-butylcyclopentadienyl)]($\eta^5$-fluorenyl)zirconium dichloride,
di(p-tolyl)methylene[$\eta^5$-(3-tert-butylcyclopentadienyl)][$\eta^5$-(3,6-di-tert-butylfluorenyl)]zirconium dichloride,
di(p-tolyl)methylene[$\eta^5$-(3-tert-butylcyclopentadienyl)][$\eta^5$-(2,7-di-tert-butylfluorenyl)]zirconium dichloride,
di(p-tolyl)methylene[$\eta^5$-(3-tert-butylcyclopentadienyl)](octamethyloctahydrodibenzofluorenyl)zirconium dichloride,
di(p-tolyl)methylene[$\eta^5$-(3-tert-butylcyclopentadienyl)] (benzofluorenyl)zirconium dichloride,
di(p-tolyl)methylene[$\eta^5$-(3-tert-butylcyclopentadienyl)] (dibenzofluorenyl)zirconium dichloride,
di(p-tolyl)methylene[$\eta^5$-(3-tert-butylcyclopentadienyl)](octahydrodibenzofluorenyl)zirconium dichloride,
di(p-tolyl)methylene[$\eta^5$-(3-tert-butylcyclopentadienyl)][$\eta^5$-(2,7-diphenyl-3,6-di-tert-butylfluorenyl)]zirconium dichloride,
di(p-tolyl)methylene[$\eta^5$-(3-tert-butylcyclopentadienyl)][$\eta^5$-(2,7-dimethyl-3,6-di-tert-butylfluorenyl)]zirconium dichloride,
di(p-tolyl)methylene[$\eta^5$-(3-n-butylcyclopentadienyl)]($\eta^5$-fluorenyl)zirconium dichloride,
di(p-tolyl)methylene[$\eta^5$-(3-n-butylcyclopentadienyl)][$\eta^5$-(3, 6-di-tert-butylfluorenyl)]zirconium dichloride,
di(p-tolyl)methylene[$\eta^5$-(3-n-butylcyclopentadienyl)][$\eta$-(2, 7-di-tert-butylfluorenyl)]zirconium dichloride, di(p-tolyl)methylene[$\eta^5$-(3-n-butylcyclopentadienyl)](octamethyloctahydrodibenzofluorenyl)zirconium dichloride,
di(p-tolyl)methylene[$\eta^5$-(3-n-butylcyclopentadienyl)](benzofluorenyl)zirconium dichloride,
di(p-tolyl)methylene[$\eta^5$-(3-n-butylcyclopentadienyl)](dibenzofluorenyl)zirconium dichloride,
di(p-tolyl)methylene[$\eta^5$-(3-n-butylcyclopentadienyl)](octahydrodibenzofluorenyl)zirconium dichloride,
di(p-tolyl)methylene[$\eta^5$-(3-n-butylcyclopentadienyl)](2,7-diphenyl-3,6-di-tert-butylfluorenyl)zirconium dichloride, and
di(p-tolyl)methylene[$\eta^5$-(3-n-butylcyclopentadienyl)][$\eta^5$-(2, 7-dimethyl-3,6-di-tert-butylfluorenyl)]zirconium dichloride.

Examples of the bridged metallocene compounds (a) further include compounds resulting from the substitution of the compounds described above with a hafnium atom or a titanium atom in place of the zirconium atom or with a methyl group in place of the chloro ligand.

The bridged metallocene compounds (a) may be used singly, or two or more may be used.

The organoaluminum oxy compound (b1) may be used a conventional aluminoxane. For example, linear or cyclic aluminoxanes represented by the formulas 2 to 5 below may be used. The organoaluminum oxy compound (b1) may include a small amount of an organoaluminum compound.

The compounds (b1) may be used singly, or two or more may be used.

[Chem. 3]

(Formula 2)

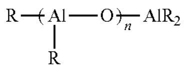

(Formula 3)

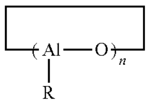

(Formula 4)

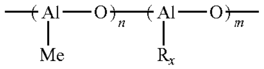

In the formulas 2 to 4, R independently at each occurrence is a C1-C10 hydrocarbon group, Rx independently at each occurrence is a C2-C20 hydrocarbon group, and m and n are each independently an integer of 2 or greater, preferably an integer of 3 or greater, more preferably an integer of 10 to 70, and particularly preferably an integer of 10 to 50.

[Chem. 4]

(Formula 5)

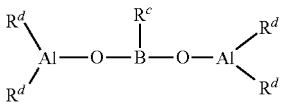

In the formula 5, $R^c$ is a C1-C10 hydrocarbon group, and $R^d$ independently at each occurrence is a hydrogen atom, a halogen atom or a C1-C10 hydrocarbon group.

Methylaluminoxane, which is an example of the organoaluminum oxy compounds (b1), is generally used as an activator in polyolefin polymerization because of its high availability and high polymerization activity. Unfortunately, methylaluminoxane is hardly soluble in saturated hydrocarbons and is therefore used as a solution in an environmentally undesirable aromatic hydrocarbon such as toluene or benzene. To address this problem, in recent years, flexible bodies of methylaluminoxane represented by the formula 4 have been developed and used as aluminoxanes dissolved in a saturated hydrocarbon. As described in, for example, U.S. Pat. Nos. 4,960,878 and 5,041,584, such modified methylaluminoxanes represented by the formula 4 are prepared using trimethylaluminum and an alkylaluminum other than trimethylaluminum, for example, trimethylaluminum and triisobutylaluminum. Aluminoxanes in which Rx is an isobutyl group are commercially available in the form of saturated hydrocarbon solutions under the trade names of MMAO and TMAO (see Tosoh Finechem Corporation, Tosoh Research & Technology Review, Vol. 47, 55 (2003)).

The compound (b2) capable of reacting with the bridged metallocene compound (a) to form an ion pair may be, for example, a Lewis acid, an ionic compound, borane, a borane compound or a carborane compound. For example, these compounds are described in Korean Pat. No. 10-0551147, JP-A-H01-501950, JP-A-H03-179005, JP-A-H03-179006, JP-A-H03-207703, JP-A-H03-207704 and U.S. Pat. No. 5,321,106. Where necessary, for example, heteropoly compounds, isopoly compounds, and ionic compounds described in JP-A-2004-51676 may be used.

The compounds (b2) may be used singly, or two or more may be used.

Examples of the Lewis acids include compounds represented by $BR_3$ (R independently at each occurrence is, for example, a fluoride, a substituted or unsubstituted C1-C20 alkyl group (for example, a methyl group) or a substituted or unsubstituted C6-C20 aryl group (for example, a phenyl group)). Some specific examples are trifluoroboron, triphenylboron, tris(4-fluorophenyl)boron, tris(3,5-difluorophenyl)boron, tris(pentafluorophenyl)boron and tris(p-tolyl)boron.

The use of the compound (b2) is economically advantageous because the amount of the compound used can be small as compared to when the compound (b1) is used.

The compound (b2) is preferably a compound represented by the following formula 6.

[Chem. 5]

(Formula 6)

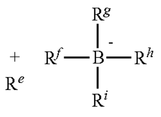

$R^{e+}$ is $H^+$, a carbenium cation, an oxonium cation, an ammonium cation, a phosphonium cation, a cycloheptyltrienyl cation, or a ferrocenium cation having a transition metal.

Examples of the carbenium cations include tris(methylphenyl)carbenium cation and tris(dimethylphenyl)carbenium cation. Examples of the ammonium cations include dimethylanilinium cation.

$R^f$ to $R^i$ are each independently an organic group, preferably a substituted or unsubstituted C1-C20 hydrocarbon group, and more preferably a substituted or unsubstituted aryl group, for example, a pentafluorophenyl group.

Preferred examples of the compounds represented by the formula 6 include N,N-alkylanilinium salts, with specific examples including N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl) borate, N,N-2,4,6-pentamethylanilinium tetraphenylborate and N,N-2,4,6-pentamethylanilinium tetrakis(pentafluorophenyl)borate.

Where necessary, the catalyst system may further include an organoaluminum compound (c). The compound (c) serves to activate other compounds such as the bridged metallocene compound (a), the compound (b1) and the compound (b2).

Preferred examples of the compounds (c) include organoaluminum compounds represented by the formula 7 below, and complex alkylated compounds represented by the formula 8 below which contain a Group I metal of the periodic table and aluminum.

The compounds (c) may be used singly, or two or more may be used.

$$R^a_mAl(OR^b)_nH_pX_q \quad \text{(Formula 7)}$$

In the formula 7, $R^a$ and $R^b$ are each independently a C1-C15, preferably C1-C4, hydrocarbon group, X is a halogen atom, m is an integer of $0<m\leq3$, n is an integer of $0\leq n\leq3$, p is an integer of $0<p\leq3$, q is an integer of $0\leq q<3$, and $m+n+p+q=3$.

$$M^2AlR^a_4 \quad \text{(Formula 8)}$$

In the formula 8, $M^2$ is Li, Na or K, and $R^a$ is a C1-C15, preferably C1-C4, hydrocarbon group.

Examples of the compounds represented by the formula 7 include trimethylaluminum and triisobutylaluminum, which are easily available.

Examples of the compounds represented by the formula 8 include $LiAl(C_2H_5)_4$ and $LiAl(C_7H_{15})_4$.

Compounds analogous to the compounds represented by the formula 7 may also be used as the compounds (c). Examples of such compounds include organoaluminum compounds in which at least two aluminum compounds are bonded via a nitrogen atom (such as, for example, $(C_2H_5)_2AlN(C_2H_5)Al(C_2H_5)_2$).

In the process (α), the amount in which the bridged metallocene compound (a) is used is preferably 5 to 50 mass % relative to all the components present in the catalyst system.

In the process (α), the amount of the compound (b1) used is preferably 50 to 500 equivalents, the amount of the compound (b2) used is preferably 1 to 5 equivalents, and the amount of the compound (c) used is preferably 5 to 100 equivalents with respect to the number of moles of the bridged metallocene compound (a) used.

Examples of the configurations of the catalyst systems include the following [1] to [4].

[1] The system includes the bridged metallocene compound (a) and the compound (b1)

[2] The system includes the bridged metallocene compound (a), the compound (b1) and the compound (c).

[3] The system includes the bridged metallocene compound (a), the compound (b2) and the compound (c).

[4] The system includes the bridged metallocene compound (a), the compound (b1) and the compound (b2).

The bridged metallocene compound (a), the compound (b1), the compound (b2) and the compound (c) may be introduced into the reaction system in any order.

The copolymer (A) may be produced by solution polymerization of ethylene and an α-olefin in the presence of the catalyst system described above.

The α-olefin is preferably a C3-C20 α-olefin. Examples of the C3-C20 α-olefins include linear α-olefins such as propylene, 1-butene, 1-pentene and 1-hexene, and branched α-olefins such as isobutylene, 3-methyl-1-butene and 4-methyl-1-pentene. The α-olefins may be used singly, or two or more may be used.

The α-olefin is preferably a C3-C6 α-olefin, and more preferably propylene.

The solution polymerization may be carried out using a medium, for example, an inert solvent such as propane, butane or hexane, or the olefin monomer itself.

In the solution polymerization, the polymerization temperature is usually 80 to 150° C., and preferably 90 to 120° C., and the polymerization pressure is usually atmospheric pressure to 500 $kgf/cm^2$, and preferably atmospheric pressure to 50 $kgf/cm^2$. These conditions may be selected appropriately in accordance with factors such as reaction materials and reaction conditions.

The solution polymerization may be carried out batchwise, semi-continuously or continuously, and is preferably performed continuously.

Modified Copolymer of Ethylene/α-Olefin Copolymer (A)

A modified copolymer of the ethylene/α-olefin copolymer (A) in the present invention [hereinafter, sometimes abbreviated as "modified copolymer".] is a copolymer obtained by providing a substituent other than a saturated hydrocarbon group, or a polar group, to the copolymer (A), more preferably a graft modified product of the copolymer (A), by one or more grafting monomers having a substituent other than a saturated hydrocarbon group, or a polar group, selected from any compounds having a carbon-carbon unsaturated bond, particularly preferably a graft modified product of the copolymer (A), by one or more selected from unsaturated carboxylic acids and derivatives thereof.

The grafting position in the modified copolymer, by such a substituent or polar group, is not particularly limited.

The modified copolymer in the present invention preferably satisfies the following (b-1), in addition to the above properties of the copolymer (A).

(b-1) The acid value is in the range of 0.1 to 200 mgKOH/g, preferably 1 to 180 mgKOH/g, more preferably 5 to 150 mgKOH/g, still more preferably 10 to 120 mgKOH/g.

The acid value of the modified copolymer in the present invention is used as an indicator of the graft ratio. The modified copolymer having an acid value in the above range has a polar moiety in a proper amount, and therefore addition of the copolymer to the liquid composition improves dispersibility of, for example, a pigment, results in anti-sagging properties due to thickening by network formation, and excellent compatibility with other components, leading to improved crack resistance.

The acid value of the modified copolymer can be adjusted by the graft ratio of, for example, a vinyl compound containing a polar group, and the graft ratio is preferably high, for example, in order to increase the acid value of the modified copolymer.

The acid value of the modified copolymer in the present invention represents the number of milligrams of potassium hydroxide necessary for neutralization of an acid included in 1 g of the modified copolymer, and may be measured by a method according to JIS K2501:2003. Specifically, the acid value is measured as described in Examples.

The compound for use in modification of the ethylene/α-olefin copolymer (A) in the present invention is preferably a compound having a substituent other than a saturated hydrocarbon group, or a polar group, selected from any compounds having a carbon-carbon unsaturated bond.

Examples of the substituents other than a saturated hydrocarbon group include substituents having an aromatic ring and/or a heteroaromatic ring, such as a benzene ring, a naphthalene ring, a pyridine ring and a thiophene ring, and examples of the polar groups include oxygen-containing groups such as carboxy groups, acid anhydride groups, ether bonds, ester bonds, hydroxy groups and epoxy groups, nitrogen-containing groups such as amide groups, imide bonds, amino groups, nitrile groups and isocyanate group, sulfur-containing groups such as sulfinyl groups, sulfanyl groups and sulfonyl groups, and silicon-containing groups such as trialkylsilyl groups and trialkoxysilyl groups.

Examples of the compounds having a carbon-carbon unsaturated bond in the present invention include compounds having an aromatic ring such as styrenes and allyl benzenes, compounds having an acid or acid-induced group such as acids, acid anhydrides, esters, amides and imides, compounds having an oxygen-containing group such as alcohols, epoxies and ethers, compounds having a nitrogen-containing group such as amines, nitriles and isocyanates, compounds having a sulfur-containing group such as sulfides, sulfoxides, sulfones and sulfonamides, and compounds having a silicon-containing group such as vinylsilanes.

Among those vinyl compounds or derivatives thereof mentioned above, compounds having an aromatic ring, compounds having an acid or acid-induced group and compounds having an oxygen-containing group are preferable, compounds having an acid or acid-induced group and compounds having an oxygen-containing group are more preferable, and unsaturated carboxylic acids and derivatives thereof are still more preferable.

Examples of the unsaturated carboxylic acids include (meth)acrylic acid, maleic acid, fumaric acid, tetrahydrophthalic acid, itaconic acid, citraconic acid, crotonic acid, isocrotonic acid and nadic acid (endocis-bicyclo[2,2,1]hept-5-ene-2,3-dicarboxylic acid).

Examples of the derivatives of the unsaturated carboxylic acids include acid anhydrides, esters, amides and imides of the unsaturated carboxylic acids described above.

Examples of the unsaturated carboxylic acid esters include esters and half esters, such as methyl (meth)acrylates, ethyl (meth)acrylates, maleic acid monoethyl esters, maleic acid diethyl esters, fumaric acid monomethyl esters, fumaric acid dimethyl esters, itaconic acid monomethyl esters and itaconic acid diethyl esters.

Examples of the unsaturated carboxylic acid amides include (meth)acrylamides, maleic acid monoamide, maleic acid diamide, maleic acid-N-monoethylamide, maleic acid-N,N-diethylamide, maleic acid-N-monobutylamide, maleic acid-N,N-dibutylamide, fumaric acid monoamide, fumaric acid diamide, fumaric acid-N-monobutylamide and fumaric acid-N,N-dibutylamide.

Examples of the unsaturated carboxylic acid imides include maleimide, N-butylmaleimide and N-phenylmaleimide.

Among those unsaturated carboxylic acids and derivatives thereof mentioned above, unsaturated dicarboxylic acids and derivatives thereof are more preferable, and, in particular, maleic acid and maleic anhydride are particularly preferable with the result that, for example, a by-product such as a homopolymer is hardly generated in a reaction for production of the modified copolymer.

Examples of the methods for modifying the ethylene/α-olefin copolymer (A) include methods for modifying by reacting with reactive gas or liquid, in addition to the above modifying method.

Examples of the reactive gases or liquids include air, oxygen, ozone, chlorine, bromine, sulfur dioxide and sulfuryl chloride, and one, or two or more thereof may be used. Among those described above, an oxidation reaction using air and/or oxygen, chlorination with chlorine, and chlorosulfonation reactions using sulfuryl chloride, chlorine and sulfur dioxide, chlorine and sulfuryl chloride, and chlorine, sulfur dioxide and sulfuryl chloride are preferable. The gas for use in the present method may be diluted with an inert gas such as nitrogen, argon or carbon dioxide to any concentration, and then used.

Methods for Producing Modified Copolymer of Ethylene/α-Olefin Copolymer (A)

The modified copolymer in the present invention may be produced by any of various known methods, for example, the following method (1) or (2).

(1) The copolymer (A) is charged into an apparatus such as an extruder or a batch reactor, and a vinyl compound and a reactive gas/liquid to be reacted are added thereto and modified.

(2) The copolymer (A) is dissolved into a solvent, and a vinyl compound and a reactive gas/liquid to be reacted are added thereto and modified.

In any of the above methods, the graft copolymerization is preferably carried out in the presence of, for example, one, or two or more radical initiators to ensure that the vinyl compound and/or the reactive gas/liquid will be graft copolymerized efficiently.

Examples of the radical initiators include organic peroxides and azo compounds.

Examples of the organic peroxides include benzoyl peroxide, dichlorobenzoyl peroxide, dicumyl peroxide, di-tert-butyl peroxide, 2,5-dimethyl-2,5-di(tert-butylperoxy)-3-hexyne, 2,5-dimethyl-2,5-di(tert-butylperoxy)hexane and 1,4-bis(tert-butylperoxyisopropyl)benzene. Examples of the azo compounds include azobisisobutyronitrile and dimethyl azoisobutyrate.

Among those described above, in particular, dialkyl peroxides such as dicumyl peroxide, di-tert-butyl peroxide, 2,5-dimethyl-2,5-di(tert-butylperoxy)-3-hexyne, 2,5-dimethyl-2,5-di(tert-butylperoxy)hexane and 1,4-bis(tert-butylperoxyisopropyl)benzene are preferably used.

The amount of the radical initiator used is usually 0.001 to 5 parts by mass, preferably 0.01 to 4 parts by mass, and still more preferably 0.05 to 3 parts by mass with respect to 100 parts by mass of the copolymer (A) before modification.

Among those described above, modification by an oxidation reaction using air and/or oxygen may be made in the presence of one, or two or more selected from, for example, metals or metal salts, inorganic acids, and organic acids, in addition to the radical initiator, in order to promote the reaction.

Examples of the metals or metal salts include manganese acetate, cobalt acetate, manganese chloride, nickel oxide and copper, examples of the inorganic acids include hydrochloric acid and nitric acid, and examples of the organic acids include formic acid, acetic acid, oxalic acid, malonic acid, maleic acid, tartaric acid, malic acid, adipic acid and citric acid.

The reaction temperature in the modification reaction is usually 20 to 350° C., preferably 60 to 300° C. In the case of modification with reactive gas, the reaction pressure is preferably ordinary pressure to 5 MPa.

The graft ratio of the substituent other than a saturated hydrocarbon or the polar group in the modified copolymer is usually 0.01 to 15 mass %, preferably 0.05 to 10 mass % of the whole mass of the modified copolymer taken as 100 mass %. The graft ratio may be measured by a known method such as NMR analysis or IR analysis.

Color Material (D)

Examples of the color materials (D) serving as one component which may be included in the ethylene/α-olefin copolymer composition of the present invention include pigments and dyes.

Examples of the pigments include inorganic pigments such as earthen pigments (such as ocher and amber), lapis lazuli, azurite, white chalk, chalk, white lead, vermilion, ultramarine, viridian, cadmium red, carbonaceous pigments (such as carbon black, and carbon nanotube), metal oxide pigments (such as iron black, cobalt blue, zinc oxide, titanium oxide, chromium oxide, and iron oxide), metal sulfide pigments (such as zinc sulfide), metal sulfates, metal carbonates (such as calcium carbonate and magnesium carbonate), metal silicates, metal phosphates, and metal powders (such as aluminum powder, bronze powder, zinc powder, and copper powder), organic pigments such as insoluble azo pigments (such as monoazo yellow, monoazo red, monoazo violet, disazo yellow, disazo orange, and pyrazolone pigments), soluble azo pigments (such as azo yellow lake and azo lake red), benzimidazolone pigments, β-naphthol pigments, naphthol AS pigments, condensed azo pigments, quinacridone pigments (such as quinacridone red and quinacridone magenta), perylene pigments (such as perylene red and perylene scarlet), perinone pigments (such as perinone orange), isoindolinone pigments (such as isoindolinone yellow and isoindolinone orange), isoindoline pigments (such as isoindoline yellow), dioxazine pigments (such as dioxazine violet), thioindigo pigments, anthraquinone pigments, quinophthalone pigments (such as quinophthalone yellow), metal complex pigments, diketopyrrolopyrrole pigments, phthalocyanine pigments (such as phthalocyanine blue and phthalocyanine green), and dye lake pigments, and fluorescent pigments such as inorganic fluorophors and organic fluorophors.

Examples of the dyes include nitroaniline, phenylmonoazo, pyridone azo, quinophthalone, styryl, anthraquinone, naphthalimide azo, benzothiazolylazo, phenyl disazo and thiazolylazo dyes.

Among those color materials mentioned above, one, or two or more kinds of the color materials may be used.

Resin (E)

Examples of the resins (E) serving as one component which may be included in the ethylene/α-olefin copolymer composition of the present invention include resin substances to be added to, for example, inks, paint materials, or coating materials.

Examples of the resins (E) relating to the present invention include rosin, hardened rosin, rosin esters, rosin-modified maleic acid resins, rosin-modified fumaric acid resins, rosin-modified phenol resins, urea resins, melamine resins, ketone resins, polyvinyl chloride, vinyl chloride/vinyl acetate copolymerized resins, styrene/maleic acid resins, polyvinyl butyral, acrylic resins, chromane/indene resins, polyester resins, polyamide resins, cellulose, nitrocellulose, acetylcellulose, petroleum resins, alkyd resins, polyvinyl pyrrolidone, urethane resins, epoxy resins, phenol resins and polyolefin resins.

Among those described above, one, or two or more kinds of the resins (E) relating to the present invention may be used. These resins may be in any form of a monomer before resin formation, a prepolymer serving as an intermediate and a polymer after a reaction.

Oil (F)

Examples of the oils (F) serving as one component which may be included in the ethylene/α-olefin copolymer composition of the present invention include drying oils, semidrying oils, non-drying oils and processing oils.

Examples of the drying oils include linseed oil, china wood oil, safflower oil, sunflower oil and walnut oil.

Examples of the semidrying oils include sesame oil and soybean oil.

Examples of the non-drying oils include castor oil, olive oil and rapeseed oil.

Examples of the processing oils include polymerized oil varnishes (varnishes obtained by thermal polymerization of linseed oil or china wood oil) and dehydrated castor oil. Among those described above, one, or two or more kinds of the oils may be used.

Solvent (C)

The solvent (C) constituting the ethylene/α-olefin copolymer composition of the present invention is a liquid substance which can dissolve or disperse, for example, the ethylene/α-olefin copolymer (A) relating to the present invention.

Examples of the solvents (C) for formation of the ethylene/α-olefin copolymer composition of the present invention include water, monohydric alcohols, glycols (diols) and derivatives thereof, glycerins, aromatic hydrocarbons, aliphatic hydrocarbons, esters, ketones, ethers, amides and mineral oils. Among these, in particular, monohydric alcohols, aromatic hydrocarbons, aliphatic hydrocarbons, esters, ketones, ethers, amides and mineral oils are preferable.

Examples of the monohydric alcohols include methanol, ethanol, 1-propanol, 2-propanol (iso-propyl alcohol), 1-butanol, 2-butanol, iso-butyl alcohol, tert-butyl alcohol, cyclohexyl alcohol, 2-ethyl-1-hexanol and benzyl alcohol.

Examples of the glycols (diols) and derivatives thereof include ethylene glycol, propylene glycol, diethylene glycol, dipropylene glycol, triethylene glycol, 1,3-butanediol, 1,4-butanediol, polyethylene glycol, polypropylene glycol, ethylene glycol monomethyl ether, ethylene glycol monoethyl ether, ethylene glycol monobutyl ether, ethylene glycol monophenyl ether and ethylene glycol monobutyl ether acetate.

Examples of the aromatic hydrocarbon include benzene, toluene, xylene and cymene.

Examples of the aliphatic hydrocarbons include pentane, hexane, octane, decane, cyclohexane, methylcyclohexane and ethylcyclohexane.

Examples of the acetic acid esters include methyl acetate, ethyl acetate, n-propyl acetate, iso-propyl acetate, n-butyl acetate, sec-butyl acetate, iso-butyl acetate, tert-butyl acetate, amyl acetate, methyl lactate and ethyl lactate.

Examples of the ketones include acetone, methyl ethyl ketone, methyl isobutyl ketone, cyclohexanone and 4-hydroxy-4-methyl-2-pentanone.

Examples of the ethers include diisopropyl ether, tetrahydrofuran, 1,4-dioxane and methyl tert-butyl ether.

Examples of the amides include N,N-dimethylformamide, N,N-dimethylacetamide and N-methylpyrrolidone.

Examples of the mineral oils include various petroleum solvents such as paraffin, naphthene and aromatic solvents.

Among those described above, one, or two or more kinds of the solvents (C) may be used.

Additional Components

The ethylene/α-olefin copolymer composition of the present invention may include various known components other than the above components.

Examples of such additional components include fillers, oils, polymer components, surfactants, weather stabilizers, heat stabilizers, antioxidants, ultraviolet absorbers, antistatic agents, antislip agents, antiblocking agents, antifogging agents, nucleating agents, lubricants, organic or inorganic foaming agents, crosslinking agents, co-crosslinking agents, crosslinking aids, adhesives, plasticizers, flame retardants, release agents, antimicrobial agents, crystallization aids, impact improvers and processing aids.

Composition

The ethylene/α-olefin copolymer composition of the present invention [hereinafter, sometimes abbreviated as "composition".] includes

- the ethylene/α-olefin copolymer (A),
- one or more selected from the color material (D), the resin (E) and the oil (F), and
- the solvent (C).

The ethylene/α-olefin copolymer composition of the present invention includes the ethylene/α-olefin copolymer (A) and the solvent (C) as essential components, as described above, and includes one or more selected from the color material (D), the resin (E) and the oil (F).

The content of the ethylene/α-olefin copolymer (A) in the composition of the present invention can be determined variously depending on the application of the composition, and is usually in the range of 0.1 to 50 mass %, preferably 0.3 to 40 mass % of the whole of the composition taken as 100 mass %.

The content of the solvent (C) in the composition of the present invention can be determined variously depending on the application of the composition, and is usually in the range of 5 to 95 mass %, preferably 10 to 90 mass % of the whole of the composition taken as 100 mass %.

When the color material (D) is included in the composition of the present invention, the content thereof can be determined variously depending on the application of the composition of the present invention, and is usually 1 to 90 mass %, preferably 2 to 80 mass % of the whole of the composition taken as 100 mass %.

When the resin (E) is included in the composition of the present invention, the content thereof can be determined variously depending on the application of the composition, and is usually in the range of 0 to 90 mass %, preferably 1 to 80 mass % of the whole of the composition taken as 100 mass %.

When the oil (F) is included in the composition of the present invention, the content thereof can be determined variously depending on the application of the composition, and is usually in the range of 0 to 70 mass % of the whole of the composition taken as 100 mass %.

The composition including the ethylene/α-olefin copolymer (A) of the present invention is excellent in pigment dispersibility, anti-sagging properties, and crack resistance after curing, and thus the ethylene/α-olefin copolymer (A) relating to the present invention can also be said to be a processability improver of the composition, for example, a pigment dispersing agent, an anti-sagging agent or an anti-cracking agent.

When the modified copolymer is included as the ethylene/α-olefin copolymer (A), a composition more excellent in pigment dispersibility, anti-sagging properties, and crack resistance after curing is obtained.

Applications of Composition

Examples of the composition according to the present invention include inks, paint materials and coating materials.

The composition of the present invention has improved processability such as anti-sagging properties, pigment dispersibility and crack resistance, and in particular can be suitably used in, for example, inks, paint materials, and coating materials.

Methods for Producing Ethylene/α-Olefin Copolymer Composition

The ethylene/α-olefin copolymer composition of the present invention may be produced by any method without limitation, and may be produced by mixing/kneading the components together using a mixing/kneading device such as a tank mixer, a planetary mixer, a kneader, a flushing kneader, a mixing roll, a roll mill, a ball mill, an attritor, a sand mill, a dissolver, extruder, a Banbury mixer or a Henschel mixer, depending on various applications.

The kneading temperature in production of the ethylene/α-olefin copolymer composition of the present invention is not particularly limited as long as the object of the present invention is not impaired, and the copolymer (A) has no melting point and is thus favorable in compatibility with additional components, and may be kneaded at a relatively low temperature of, for example, 20 to 60° C.

When the ethylene/α-olefin copolymer composition of the present invention is used as a paint material, the method for coating with the paint material may be a known method without limitation. Specific examples include coating using, for example, a roller, a brush, spray, a roll coater, or an applicator, immersion in a paint material bath, electrodeposition for flowing of current with a substrate, coating by any of various printing machines such as offset printing machines, flexo printing machines, relief printing machines, gravure printing machines and ink-jet printers, and coating by ejection from pen tips.

The coating film obtained may be a coating film subjected to coating of a substrate and then, if necessary, drying and/or curing by an appropriate method. The drying and/or curing method(s) may be known method(s) without limitation. Specific examples include natural drying in airy outdoors, heating by an oven and irradiation with light such as ultraviolet light.

EXAMPLES

Hereinbelow, the present invention will be described in greater detail based on Examples. However, it should be construed that the scope of the present invention is not limited to such Examples.

<Production of Copolymer (A) and Modified Copolymer>

The copolymer (A) and the modified copolymer were produced according to the following Synthesis Examples and Production Examples.

Synthesis Example 1

Synthesis of [ethylene($\eta^5$-cyclopentadienyl) ($\eta^5$-2,7-di-tert-butylfluorenyl)]zirconium dichloride

[Ethylene($\eta^5$-cyclopentadienyl) ($\eta^5$-2,7-di-tert-butylfluorenyl)]zirconium dichloride was synthesized by the method described in Japanese Patent No. 4367687.

Synthesis Example 2

Synthesis of [methylphenylmethylene($\eta^5$-cyclopentadienyl) ($\eta^5$-2,7-di-tert-butylfluorenyl)]zirconium dichloride

[Methylphenylmethylene($\eta^5$-cyclopentadienyl) ($\eta^5$-2,7-di-tert-butylfluorenyl)]zirconium dichloride was synthesized by the method described in Japanese Patent No. 6496533.

Production Example 1

Synthesis of Ethylene/Propylene Copolymer (A-1)

A 2 L internal volume stainless steel autoclave thoroughly purged with nitrogen was loaded with 760 mL of heptane and 120 g of propylene. The temperature of the system was raised to 150° C., and the total pressure was increased to 3 MPaG by supplying 0.85 MPa of hydrogen and 0.19 MPa of ethylene. Next, 0.4 mmol of triisobutylaluminum, 0.0002 mmol of [methylphenylmethylene($\eta^5$-cyclopentadienyl) ($\eta^5$-2,7-di-tert-butylfluorenyl)]zirconium dichloride and 0.002 mmol of N,N-dimethylanilinium tetrakis(pentafluorophenyl)borate were injected with nitrogen. Polymerization was initiated by performing stirring at a rotational speed of 400 rpm. Thereafter, only ethylene was continuously supplied to keep the total pressure at 3 MPaG, and the polymerization was carried out at 150° C. for 5 minutes. The polymerization was terminated by the addition of a small amount of ethanol into the system, and unreacted ethylene, propylene and hydrogen were purged. The polymerization solution obtained was washed with 1000 mL of 0.2 mol/L hydrochloric acid three times and then with 1000 mL of distilled water three times, and was dried over magnesium sulfate. The solvent was distilled off under reduced pressure. The residue was dried at 80° C. under reduced pressure over night. Thus, a crude ethylene/propylene copolymer was obtained.

A 1 L internal volume stainless steel autoclave was loaded with 100 mL of a 0.5 mass % hexane solution of Pd/alumina catalyst and 500 mL of a 30 mass % hexane solution of the crude ethylene/propylene copolymer obtained. The autoclave was tightly closed and was purged with nitrogen. Next, the temperature was raised to 140° C. while performing stirring, and the inside of the system was purged with hydrogen. The pressure was increased to 1.5 MPa with hydrogen, and hydrogenation reaction was carried out for 15 minutes. Thus, 60.9 g of an ethylene/propylene copolymer was obtained.

Production Example 2

Synthesis of Ethylene/Propylene Copolymer (A-2)

A 2 L volume continuous polymerization reactor equipped with a stirring blade and thoroughly purged with nitrogen was loaded with 1 L of dehydrated and purified hexane. A 96 mmol/L hexane solution of ethylaluminum sesquichloride ($Al(C_2H_5)_{1.5}{\cdot}Cl_{1.5}$) was continuously supplied at a rate of 500 mL/h for 1 hour. Further, a 16 mmol/L hexane solution of $VO(OC_2H_5)Cl_2$ as a catalyst, and hexane were continuously supplied at rates of 500 mL/h and 500 mL/h, respectively. On the other hand, the polymerization solution was continuously withdrawn from the top of the reactor so that the amount of the polymerization solution in the reactor would be constant at 1 L.

Next, 36 L/h ethylene gas, 36 L/h propylene gas and 30 L/h hydrogen gas were supplied through bubbling tubes. The copolymerization reaction was carried out at 35° C. while circulating a refrigerant through a jacket attached to the outside of the reactor. In this manner, a polymerization solution including an ethylene/propylene copolymer was obtained.

The polymerization solution obtained was washed with 500 mL of 0.2 mol/L hydrochloric acid with respect to 1 L of the polymerization solution three times and then with 500 mL of distilled water with respect to 1 L of the polymerization solution three times, and was dried over magnesium sulfate. The solvent was distilled off under reduced pressure. The viscous liquid obtained was dried under reduced pressure at 130° C. for 24 hours. Thus, an ethylene/propylene copolymer (A-2) was obtained.

Production Example 3

Synthesis of Ethylene/Propylene Copolymer (A-3)

An ethylene/propylene copolymer (A-3) was obtained by appropriately controlling the supply rates of ethylene gas, propylene gas and hydrogen gas in Production Example 1.

Production Example 4

Synthesis of Modified Copolymer (B-1) of Ethylene/Propylene Copolymer (A-1)

A 200 mL glass reactor with a stirrer equipped with a nitrogen blowing tube, a water cooling condenser, a thermometer and two dripping funnels was charged with 100 g of the copolymer (A-1) obtained in Production Example 1. The temperature was raised to 120° C., nitrogen bubbling was started, and the inside of the system was kept warm at 160° C. Thereafter, 6.6 g of maleic anhydride (warmed around 70° C. in the liquid state) and 1.3 g of di-tert-butyl peroxide with which the two dripping funnels were charged in advance respectively were supplied over 5 hours, and reacted over 1 hour after completion of the supplying. Next, the temperature was further raised to 175° C., the pressure in the inside of the system was released and then reduced for 1 hour with gradual ventilation with nitrogen by a vacuum pump. Thus, impurities (decomposed products of unreacted maleic anhydride and di-tert-butyl peroxide) were removed.

A modified copolymer (B-1) of the ethylene/propylene copolymer was obtained by the above operations.

Production Example 5

Synthesis of Modified Copolymer (B-2) of Ethylene/Propylene Copolymer (A-2)

The same reaction as in Production Example 4 was performed to remove impurities in the same manner, except that the copolymer (A-1) obtained in Production Example 1 was changed to the copolymer (A-2) obtained in Production Example 2, the amounts of maleic anhydride and di-tert-butyl peroxide were changed to 2.8 g and 0.6 g respectively, and addition was made over 2 hours. A modified copolymer (B-2) of the ethylene/propylene copolymer (A-2) was obtained by the above operations.

Production Example 6

Synthesis of Modified Copolymer (B-3) of Ethylene/Propylene Copolymer (A-2)

The same reaction as in Production Example 4 was performed to remove impurities in the same manner, except that the copolymer (A-1) obtained in Production Example 1 was changed to the copolymer (A-3) obtained in Production Example 3, the amounts of maleic anhydride and di-tert-butyl peroxide were changed to 3.8 g and 0.8 g respectively, and addition was made over 3 hours. A modified copolymer (B-3) of the ethylene/propylene copolymer (A-3) was obtained by the above operations.

Properties of the copolymers (A-1) to (A-3) and the modified copolymers (B-1) to (B-3) obtained in Production Examples 1 to 6 were measured by the following methods. The analysis results of (A-1) to (A-3) are described in Table 1, and the analysis results of (B-1) to (B-3) are described in Table 2.

Methyl Group Index

A $^1$H-NMR spectrum was measured using AVANCEIII cryo-500 nuclear magnetic resonance apparatus manufactured by Bruker BioSpin GmbH. Deuterated chloroform was used as a solvent. The sample concentration was 20 mg/0.6 mL, and the measurement temperature was 50° C. The observation nuclear was $^1$H (500 MHz), the sequence was single pulse, the pulse width was 5.00 μs (45° pulse), the repetition time was 7.0 seconds, and the cumulative number was 64. The reference for the determination of chemical shifts was the solvent peak (7.24 ppm) assigned to $CHCl_3$ in deuterated chloroform.

With respect to the $^1$H-NMR spectrum thus measured, the methyl group index was determined by calculating the ratio of the integral of a peak observed in the range of 0.50 to 1.15 ppm to the integral of peaks observed in the range of 0.50 to 2.20 ppm.

Weight Average Molecular Weight (Mw)

The Mw was determined by the following high-performance GPC measurement apparatus.

High-performance GPC measurement apparatus: HLC 8320GPC manufactured by TOSOH CORPORATION Mobile phase: THF (manufactured by FUJIFILM Wako Pure Chemical Corporation, stabilizer-free, liquid chromatography grade)

Columns: Two TSKgel Super Multipore HZ-M columns manufactured by TOSOH CORPORATION were connected in series Sample concentration: 5 mg/mL Mobile phase flow rate: 0.35 mL/min Measurement temperature: 40° C.

Standard sample for calibration curve: PStQuick MP-M manufactured by TOSOH CORPORATION Measurement of Melting Peak All the melting peaks were measured using X-DSC-7000 manufactured by Seiko Instruments Inc. Approximately 8 mg of a sample was added into an easily sealable aluminum sample pan, and the pan was arranged in a DSC cell. The DSC cell was placed in a nitrogen atmosphere, and the temperature was increased from room temperature to 150° C. at 10° C./min, then held at 150° C. for 5 minutes, and lowered at 10° C./min to cool the DSC cell to −100° C. (cooling process). Subsequently, the DSC cell was held at −100° C. for 5 minutes, and the temperature was increased to 15° C. at 10° C./min. With respect to the enthalpy curve recorded during the heating process, the temperature at the peak top was adopted as the melting point (Tm), and the total amount of endothermic heat associated with melting was determined as the heat of fusion (ΔH). The sample was deemed as having no melting peak when any peak was not observed or when the value of the heat of fusion (ΔH) was not more than 1 J/g. The melting point (Tm) and the heat of fusion (ΔH) were determined based on JIS K7121.

Solvent (C)

The following commercially available solvents were used in Examples and Comparative Examples described below.

"C-1": butyl acetate (manufactured by FUJIFILM Wako Pure Chemical Corporation)

"C-2": methylcyclohexane (manufactured by FUJIFILM Wako Pure Chemical Corporation)

"C-3": paraffin mineral oil (manufactured by Idemitsu Kosan Co., Ltd., Diana Process Oil PW-90, kinematic viscosity at 100° C.=11 cSt)

<Color Material (D)>

"D-1": carbon black (manufactured by ASAHI CARBON CO., LTD., Asahi #50)

The following polymers were used in Comparative Examples described below.

(G-1) to (G-3) were analyzed by the same methods as in (A-1) to (A-3), and properties thereof were measured. The results are described in Table 3.

"G-1": polyethylene wax

"G-2": liquid poly α-olefin

"G-3": liquid polyisobutylene

TABLE 1

| Prod. Ex. | Sample name | Methyl group index (%) | Mw (g/mol) | Melting peak (° C.) |
|---|---|---|---|---|
| 1 | A-1 | 48 | 5,200 | N.D. |
| 2 | A-2 | 47 | 8,700 | N.D. |
| 3 | A-3 | 46 | 12,900 | N.D. |

"N.D." indicates that no melting peak was observed.

TABLE 2

| Prod. Ex. | Sample name | Methyl group index (%) | Mw (g/mol) | Melting peak (° C.) | Acid value (mgKOH/g) |
|---|---|---|---|---|---|
| 4 | B-1 | 49 | 5,600 | N.D. | 60 |
| 5 | B-2 | 47 | 10,300 | N.D. | 25 |
| 6 | B-3 | 46 | 17,200 | N.D. | 35 |

"N.D." indicates that no melting peak was observed.

TABLE 3

| Sample name | Methyl group index (%) | Mw (g/mol) | Melting peak (° C.) |
|---|---|---|---|
| G-1 | — | 2,700 | 110 |
| G-2 | 29 | 5,900 | N.D. |
| G-3 | 70 | 2,100 | N.D. |

"—" indicates no evaluation, and "N.D." indicates that no melting peak was observed.

Examples 1 to 8 and Comparative Examples 1 to 8

Production of Liquid Composition (Ink Composition)

The components described in the Formulation columns in Tables 4, 5 and 6, in numerical values (parts by mass) described in the columns, were placed in a lidded glass vial, mixed under shaking by hand for 1 minute and then treated by ultrasonication for 30 minutes. Thus, a composition was obtained.

Evaluation of Composition for Simple Evaluation

The compositions obtained in Examples 1 to 8 and Comparative Examples 1 to 8 were evaluated according to the following methods. The results are described in Tables 4, 5 and 6.

Dispersibility of Color Material

The liquid composition was visually observed and evaluated according to the following criteria.

Evaluation Criteria

BB: neither precipitation of the color material, nor coarse particles with color material aggregation were observed.

CC: precipitation of the color material and coarse particles with color material aggregation were slightly observed.

DD: precipitation of the color material and coarse particles with color material aggregation were remarkably observed.

Anti-Sagging Properties

About 15 mg of the liquid composition was placed on a PET Lumirror so as to be in the form of a circle having a diameter of 1 cm. The Lumirror was set up vertically and left to stand still for 5 minutes, and then returned horizontally. The length of sagging of the composition from the lower end of the circle was here measured, and evaluated according to the following criteria.

Evaluation Criteria

AA: the length of sagging was not less than 0 cm and less than 0.5 cm.

BB: the length of sagging was not less than 0.5 cm and less than 1 cm.

CC: the length of sagging was not less than 1 cm and less than 2 cm.

DD: the length of sagging was not less than 2 cm.

TABLE 4

| | | Comp. Ex. 1 | Ex. 1 | Ex. 2 | Ex. 3 | Ex. 4 |
|---|---|---|---|---|---|---|
| Formulation | A-1 | | 33 | | | |
| | B-1 | | | 33 | 20 | |
| | B-3 | | | | | 33 |
| | C-1 | 75 | 50 | 50 | 60 | 50 |
| | D-1 | 25 | 17 | 17 | 20 | 17 |
| Evaluation | Dispersibility of color material | DD | CC | BB | BB | BB |
| | Anti-sagging properties | — | CC | CC | AA | AA |

In the table, "—" indicates no evaluation.

TABLE 5

| | | Comp. Ex. 2 | Comp. Ex. 3 | Comp. Ex. 4 | Comp. Ex. 5 | Ex. 5 |
|---|---|---|---|---|---|---|
| Formulation | A-3 | | | | | 33 |
| | C-1 | 50 | 50 | 50 | | |
| | C-2 | | | | 75 | 50 |
| | C-3 | 33 | | | | |
| | D-1 | 17 | 17 | 17 | 25 | 17 |
| | G-1 | | 33 | | | |
| | G-2 | | | 33 | | |
| Evaluation | Dispersibility of color material | DD | DD | DD | DD | CC |
| | Anti-sagging properties | DD | — | DD | — | CC |

In the table, "—" indicates no evaluation.

TABLE 6

| | | Ex. 6 | Ex. 7 | Ex. 8 | Comp. Ex. 6 | Comp. Ex. 7 | Comp. Ex. 8 |
|---|---|---|---|---|---|---|---|
| Formulation | B-1 | 33 | | | | | |
| | B-2 | | 33 | | | | |
| | B-3 | | | 33 | | | |
| | C-2 | 50 | 50 | 50 | 50 | 50 | 50 |
| | C-3 | | | | 33 | | |
| | D-1 | 17 | 17 | 17 | 17 | 17 | 17 |

TABLE 6-continued

| | | Ex. 6 | Ex. 7 | Ex. 8 | Comp. Ex. 6 | Comp. Ex. 7 | Comp. Ex. 8 |
|---|---|---|---|---|---|---|---|
| | G-1 | | | | | 33 | |
| | G-3 | | | | | | 33 |
| Evaluation | Dispersibility of color material | BB | BB | BB | DD | DD | CC |
| | Anti-sagging properties | BB | BB | AA | DD | — | DD |

In the table, "—" indicates no evaluation.

In Comparative Examples 1 and 4, coarse particles of carbon black were collected to cause a mass extremely inferior in fluidity, and no composition which could be evaluated about sagging properties was obtained.

In Comparative Examples 3 and 6, wax was not dissolved and was precipitated together with carbon black, and no uniform composition could be obtained.

The invention claimed is:

1. An ethylene/α-olefin copolymer composition comprising:

an ethylene/α-olefin copolymer (A) satisfying requirements (a-1) to (a-3) described below, wherein a content of the ethylene/α-olefin copolymer (A) is 20 to 50 mass % of the whole of the composition taken as 100 mass %;

one or more selected from a color material (D), a resin (E) and an oil (F); and a solvent (C);

(a-1) a methyl group index measured by 1H-NMR is in a range of 40 to 60%, (a-2) a weight average molecular weight (Mw) determined by gel permeation chromatography (GPC) is in a range of 3,000 to 30,000, (a-3) no melting peak is observed at temperatures ranging from-100° C. to 150° C. in differential scanning calorimetry (DSC).

2. The ethylene/α-olefin copolymer composition according to claim 1, wherein the ethylene/α-olefin copolymer (A) is a modified copolymer modified by one or more selected from compounds having a carbon-carbon unsaturated bond.

3. The ethylene/α-olefin copolymer composition according to claim 1, wherein the ethylene/α-olefin copolymer (A) is a modified copolymer modified by one or more compounds selected from unsaturated carboxylic acids and unsaturated carboxylic acid derivatives.

4. The ethylene/α-olefin copolymer composition according to claim 1, wherein the ethylene/α-olefin copolymer (A) is a modified copolymer modified by one or more compounds selected from unsaturated carboxylic acids and unsaturated carboxylic acid derivatives, and satisfies a requirement (b-1) described below, (b-1) an acid value is 0.1 to 200 mgKOH/g.

5. The ethylene/α-olefin copolymer composition according to claim 1, wherein the composition comprises the ethylene/α-olefin copolymer (A) as a processability improver.

6. The ethylene/α-olefin copolymer composition according to claim 1, wherein the solvent (C) comprises a solvent selected from aliphatic hydrocarbons and acetic acid esters.

7. The ethylene/α-olefin copolymer composition according to claim 1, wherein the composition comprises a pigment as the color material (D).

8. The ethylene/α-olefin copolymer composition according to claim 1, wherein the one or more selected from the color material (D), the resin (E) and the oil (F) is the color material (D).

9. An ink comprising the ethylene/α-olefin copolymer composition according to claim 1.

10. A paint material comprising the ethylene/α-olefin copolymer composition according to claim 1.

11. A coating material comprising the ethylene/α-olefin copolymer composition according to claim 1.

* * * * *